W. PEEBLES.
POTATO-DIGGER.

No. 172,826.  Patented Feb. 1, 1876.

Witnesses:  Inventor.
John E. Bauman  William Peebles.
H. S. Bauman

UNITED STATES PATENT OFFICE.

WILLIAM PEEBLES, OF DAVIDSON COUNTY, ASSIGNOR OF ONE-HALF HIS RIGHT TO WILLIAM W. JOHNSON, OF NASHVILLE, TENNESSEE.

IMPROVEMENT IN POTATO-DIGGERS.

Specification forming part of Letters Patent No. 172,826, dated February 1, 1876; application filed April 23, 1875.

*To all whom it may concern:*

Be it known that I, WILLIAM PEEBLES, of the county of Davidson, State of Tennessee, have invented a certain new and useful Agricultural Implement for Digging Sweet Potatoes, of which the following is a description and specification:

My invention consists in the construction and combination of the bottom cutter A A of the shovel plow with the side cutters or colters B B, for the purpose of cutting off the vines on each side of the potato-rows, so as to permit the shovel A A to lift up and separate the potatoes from the soil as it passes under them, so they can be gathered more easily, as the side vines by being cut off, are easily pushed toward the middle space between the rows.

Figure 1:
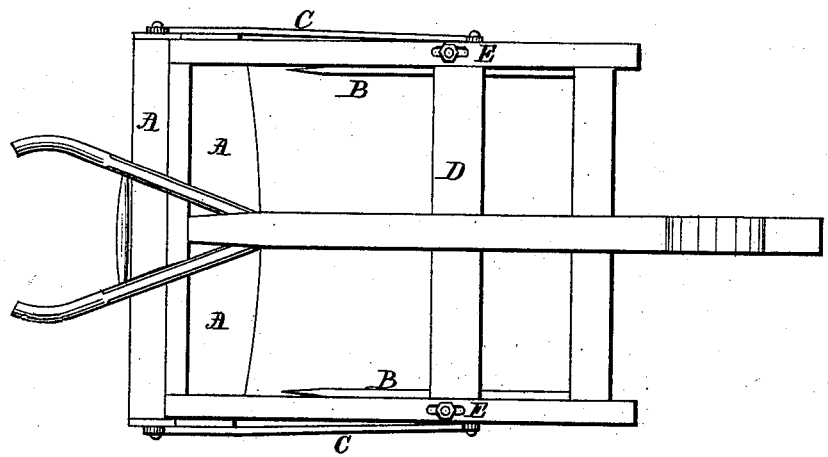
Figure 2:
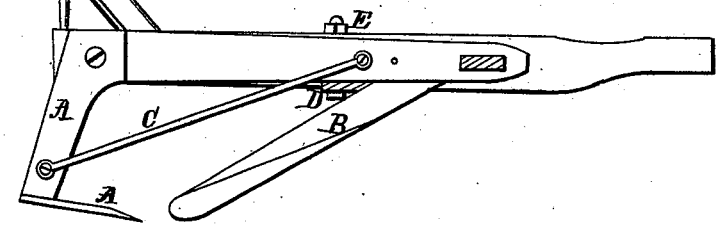

Figure 1, a top view of the implement, showing the construction of the frame work and the manner of attaching the bottom shovel A A, side cutters B B, side brace-rods C C, and adjusting-bar D for the side cutters; Fig. 2, a side view of the implement, showing this view of the arrangement, and combination of the same parts as enumerated in Fig. 1.

I construct the frame of the implement, as shown, with side and end pieces, and a middle draft-bar, F, for the attachment of the clevis, single-tree, &c., in the usual manner.

A pair of handles of the ordinary construction are attached to the back end of the draft-bar F and the back end piece of the frame, as shown, for handling the same.

The shovel A A is constructed of steel, or iron laid with steel on its cutting-edge, and formed with end pieces or knees on each end, as shown at A, Fig. 2, for the purpose of fastening it firmly to the frame-work; and, to give it greater strength and rigidity, I attach to it on each side brace-bars C C, one end of which is firmly fastened to the end pieces or knees of the shovel A A near their bottom end, and the other end is fastened to the side pieces of the frame near their forward end, so as to form adjustable braces and tension-rods for the shovel A A.

The side cutters B B are formed and shaped, as shown, out of steel, or iron laid with steel, to form cutting-edges on the bottom or forward edge of same, for cutting the vines on each side of the potato-rows.

These cutters are fastened to the inside of the side pieces of the frame near the forward end, and are held down and adjusted by the cross-bar D, which is secured to the bottom edge of the side pieces of the frame by the bolts E E, which work in a slotted mortise in said side pieces.

By moving this adjusting-bar D forward or backward the cutters B B can easily be adjusted with reference to the shovel A A.

Having thus fully described my implement, I claim as my invention—

The combination of the shovel A A, side cutters B B, adjustable tension-rods C C, and adjustable bar, D, constructed and operating substantially as herein described, and for the purpose specified.

WILLIAM PEEBLES.

Witnesses:
  JOHN E. BAUMAN,
  H. S. BAUMAN.